United States Patent [19]

Hoeflich et al.

[11] Patent Number: 4,954,923

[45] Date of Patent: Sep. 4, 1990

[54] INTRINSIC SAFETY MODULE INTERFACE

[75] Inventors: John C. Hoeflich, Austin; David W. Curry, Cedar Park, both of Tex.

[73] Assignee: Cooper Industries, Inc., Houston, Tex.

[21] Appl. No.: 234,037

[22] Filed: Aug. 19, 1988

[51] Int. Cl.⁵ ............................................. H02H 3/20
[52] U.S. Cl. .................................... 361/111; 361/119
[58] Field of Search .................. 361/54, 56, 87, 88, 361/91, 111, 117–119; 379/98, 443, 451, 437; 73/23; 367/81, 86, 13, 147, 901

[56] References Cited

U.S. PATENT DOCUMENTS

| | | |
|---|---|---|
| 3,527,985 | 9/1970 | Brown . |
| 3,631,264 | 12/1971 | Morgan . |
| 3,684,924 | 8/1972 | Miller, Jr. . |
| 3,818,273 | 6/1974 | Nakashima et al. . |
| 3,878,434 | 4/1975 | Voorhoeve . |
| 3,968,407 | 7/1976 | Wilson .............................. 361/111 |
| 3,997,733 | 12/1976 | Sanders . |
| 4,393,485 | 7/1983 | Redden ........................... 367/86 X |
| 4,412,265 | 10/1983 | Buuch ............................. 361/111 |
| 4,592,069 | 5/1986 | Redding ........................ 379/443 X |
| 4,679,115 | 7/1987 | Connan et al. ................. 361/119 |
| 4,716,536 | 12/1987 | Blanchard ...................... 361/284 X |
| 4,737,776 | 4/1988 | Wireman ........................ 361/119 X |

FOREIGN PATENT DOCUMENTS

| | | |
|---|---|---|
| 1381035 | 1/1975 | United Kingdom . |
| 1412036 | 10/1975 | United Kingdom . |
| 1507558 | 4/1978 | United Kingdom . |
| 2126025 | 3/1984 | United Kingdom . |
| 2145858 | 4/1985 | United Kingdom . |
| 2205699 | 12/1988 | United Kingdom . |

Primary Examiner—William M. Shoop, Jr.
Assistant Examiner—A. Jonathan Wysocki
Attorney, Agent, or Firm—Wigman & Cohen

[57] ABSTRACT

An interface system interconnects a common power supply and plural data communications paths located in a safe environment to a plurality of load devices located in a flammable atmosphere. A module power attenuator attenuates the electrical power output level of the common power supply to a first predetermined level for application to the load devices. A digital signal attenuator attenuates the electrical power level between data communications paths to a second predetermined level for application to the load devices. Coupling devices are utilized to maintain electrical segregation but allow communication to and from the safe environment.

12 Claims, 2 Drawing Sheets

INTRINSIC SAFETY MODULE INTERFACE

FIELD OF THE INVENTION

The present invention relates generally to apparatus for data acquisition and presentation in flammable atmospheres, and more particularly to electronic data acquisition and display systems for monitoring and controlling equipment used in hazardous areas (for example, drilling rigs) while providing intrinsically safe electrical circuitry especially suitable for use in the flammable atmosphere of such equipment.

DESCRIPTION OF THE PRIOR ART

Hazardous environments of the type in which flammable materials are or may be present in the atmosphere require that steps be taken to prevent ignition of the flammable materials by isolating ignition sources (such as sparks and hot surfaces) from the flammable atmospheres. In the past, the approaches taken to provide such isolation have included explosion-proofing and inert gas purging, both of which present problems and limitations attributable to the bulky and expensive enclosures and frequent maintenance required to implement those techniques. Another technique found in the prior art, referred to as intrinsic safety, involves the design of equipment suitable to prevent the generation of sparks or high temperatures which could cause ignition of the flammable materials. In other words, this latter approach removes the source of ignition in the first place. This is achieved by carefully restricting the electrical energy which is stored by, supplied to, or generated within the system to levels below that level of electrical energy required to produce a spark under the worst circumstances likely to be encountered. Thus, an intrinsically safe circuit will not produce a spark or thermal effect to cause ignition of a flammable material under any circumstances likely to occur in use of the circuit, including use under conditions which may arise in the presence of internal faults.

Hazardous environments of the type of interest herein are typically encountered at oil drilling rigs, for example, where gases such as hydrogen, methane, propane, and ethylene may be present, although it will be understood that flammable atmospheres are a risk in many other industries where gases, vapors, dusts or flyings are present. In those instances, it is customary to restrict circuitry capable of generating sparks or thermal effects to a safe area (i.e., an area where existence of a flammable atmosphere is extremely unlikely) which is separated from circuitry in the hazardous area by some form of barrier. Heretofore, intrinsic safety has been achieved by limiting the amount of electrical energy entering the hazardous area, through the use of zener barriers, for example. Such arrangements may involve small, self-contained circuits which limit the maximum voltage and current that may be supplied through the circuit itself. An example of a prior art zener barrier is the arrangement disclosed in U.S. Pat. No. 4,412,265 to Buuck. There, the barrier includes a transistor and a first zener diode combination utilized as a source of controlled voltage to the output lines of the barrier. For purposes of protection, a fuse is provided at the input end of that combination, and two additional zener diodes are provided at the output. The latter zeners have a voltage rating greater than or equal to the other zener diode, and have destruction times materially greater than the blow time of the fuse. In the Buuck arrangement, the output line also contains a resistor selected to maintain the current level at a value which is deemed safe. With the zener barrier, energy storage limitations are placed on the loads that may be connected, usually in terms of inductance (L) and capacitance (C) thereof.

A significant problem is encountered when it becomes necessary or desirable for several loads to share a common power source or other interconnections, such that the sum of the energy storage elements represented by the several load devices exceeds the requirements for intrinsic safety. In such a situation, it is essential that the individual parts of the commonly supplied circuit be isolated to prevent them from combining and creating a hazardous situation. That isolation must be maintained under the worst possible conditions, including an event of likely component failure or circuit fault.

It is a principal object of the present invention to provide an intrinsic safety module interface for use in such isolation.

The provision of multiple barriers is relatively commonplace. For example, in U.S. Pat. No. 3,631,264, Morgan discloses a multiple barrier system for limiting transfer of electrical energy to intrinsically safe levels, in which each individual barrier has a fuse and two resistors in series and a zener diode for limiting the voltage at the junctions of the resistors. A high voltage selector connects each voltage to a master barrier having a voltage limiting zener diode which is bypassed by a controlled rectifier that fires if the last diode is overdriven. According to Morgan, barriers are replaced with n+1 barriers and the individual barrier structure is simplified to an extent that, for relatively small values of n, the initial cost of the n+1 barriers is less than the initial cost of the n barriers. The (n +1 )th barrier is the "master" barrier, and the remainder of the n+1 barriers are shared with the master barrier. The master barrier is coupled by an OR circuit to the individual barriers such that the zener diode of the master provides the second zener diode of each individual barrier, which, however, provides somewhat less intrinsic safety than is provided by a standard two zener diode barrier.

To improve the intrinsic safety of the system, Morgan modifies the individual barriers by replacing one of the two individual barrier resistors with a current limiting resistance in the form of a pair of self-biased transistors. Further, he proposes that the zener diode of the master barrier be made more failure proof by providing it with current capacity exceeding its needs. Such multiple barrier systems, however, are still supplied from a plurality of separate power supplies to a plurality of separate portions of the circuit within the hazardous area. They are not used or suggested for use where a common power supply is shared by several load devices.

Accordingly, it is a more specific object of the present invention to provide an intrinsic safety module interface which will allow several loads to share a common power source or other interconnections despite the fact that the sum of the energy storage elements of those loads exceeds the requirements of intrinsic safety.

SUMMARY OF THE INVENTION

According to the present invention, the intrinsic safety module interface (ISMI) is installed between a power supply and the various load devices. It replaces multiple zener barriers, and may be installed in the hazardous area. The capability of installation of the ISMI in the hazardous area constitutes a significant distinction of the invention over the use of several zener barriers to perform a similar function. Further, the power supply now has an intrinsically safe output. To provide flexibility in the number of load devices that may be connected to a single shared power supply, the ISMI master may be cascaded to a sufficient number of ISMI slaves to accommodate such number of load devices. The system of the present invention enables the various load devices to be unspecified except for defining their maximum capabilities of storing energy and the segregation between loads. Segregation between load devices is required to prevent several loads from combining to produce unsafe energy storing capacities.

The ISMI module system allows multiple loads to be connected to the common power supply in a manner such that the sum of the storage capabilities of the total number of load devices exceeds the maximum allowable storage capacity for a single load device. The resultant effective increase in capacitance for any single load device improves the operating performance of the electronic circuits and provides the circuit designer with greater flexibility. As noted earlier, however, in order to prevent the load devices from combining to create unsafe energy storing capabilities, the individual loads must also be separated.

In the ISMI configuration of an embodiment of the present invention, the necessary attenuation of power and voltage for the power wiring in the circuit is provided by a module power attenuator (MPA) which includes a series of resistors to limit current and a zener diode assembly to limit voltage. The ISMI module further comprises a digital signal attenuator (DSA), which, in the preferred embodiment, for example, is simply a resistor, to provide attenuation for the data communications wiring. In the case of the DSA, the maximum applied voltage and the maximum power which may be transferred to the load device of the data communication lines is reduced and properly defined. The ISMI module also provides separation between circuits by means of devices, such as opto-couplers, to segregate the intrinsically safe power supply circuit from the multiple intrinsically safe data communication circuit pathways.

Therefore, it is another object of the present invention to provide an intrinsic safety module interface(s) which serves to isolate interconnected electrical loads with total energy storage capacity in excess of intrinsic safety guidelines, and thereby to allow such loads to remain intrinsically safe while sharing power and communications.

It is yet another object of the present invention to provide one or more intrinsic safety module interfaces that will allow an increase in total power transferred to multiple load devices from a common source, such that the sum of the storage capacities of the load devices is greater than the allowable storage capacity for a single intrinsically safe device.

In an exemplary embodiment, ISMI modules of the present invention are employed to provide an intrinsically safe power and data communications interface to a liquid crystal display (LCD) instrumentation panel of a data acquisition console for drilling rigs. It is to be emphasized, however, that the ISMI arrangement may be used to provide an intrinsically safe power and/or communications interface to any intrinsically safe loads, with power limitations of the power supply and the ISMI module. In the illustrative embodiment, the console systems are computerized to monitor and control all drilling functions, such as hook load, bit weight, drilling mud temperature and density, mud volume and deviation, and mud flow and fill. The console includes a keyboard and display modules for the various functions to be monitored and controlled. In a typical system configuration, sensors for detecting the selected functions operate as transducers to generate signals representative of their respective functions. The data is supplied to signal conditioners and one or more computers (with redundancy for back-up), and together with the necessary operating voltage and current from an intrinsically safe power supply, is delivered to the console display panel which includes the keyboard and display modules.

BRIEF DESCRIPTION OF THE DRAWINGS

The above and still further objects, features and attendant advantages of the present invention will become apparent to those skilled in the art from a consideration of the following detailed description of a presently preferred embodiment thereof, taken in conjunction with the accompanying drawings in which.

DETAILED DESCRIPTION OF THE PREFERRED EMBODIMENT

Figure 1:
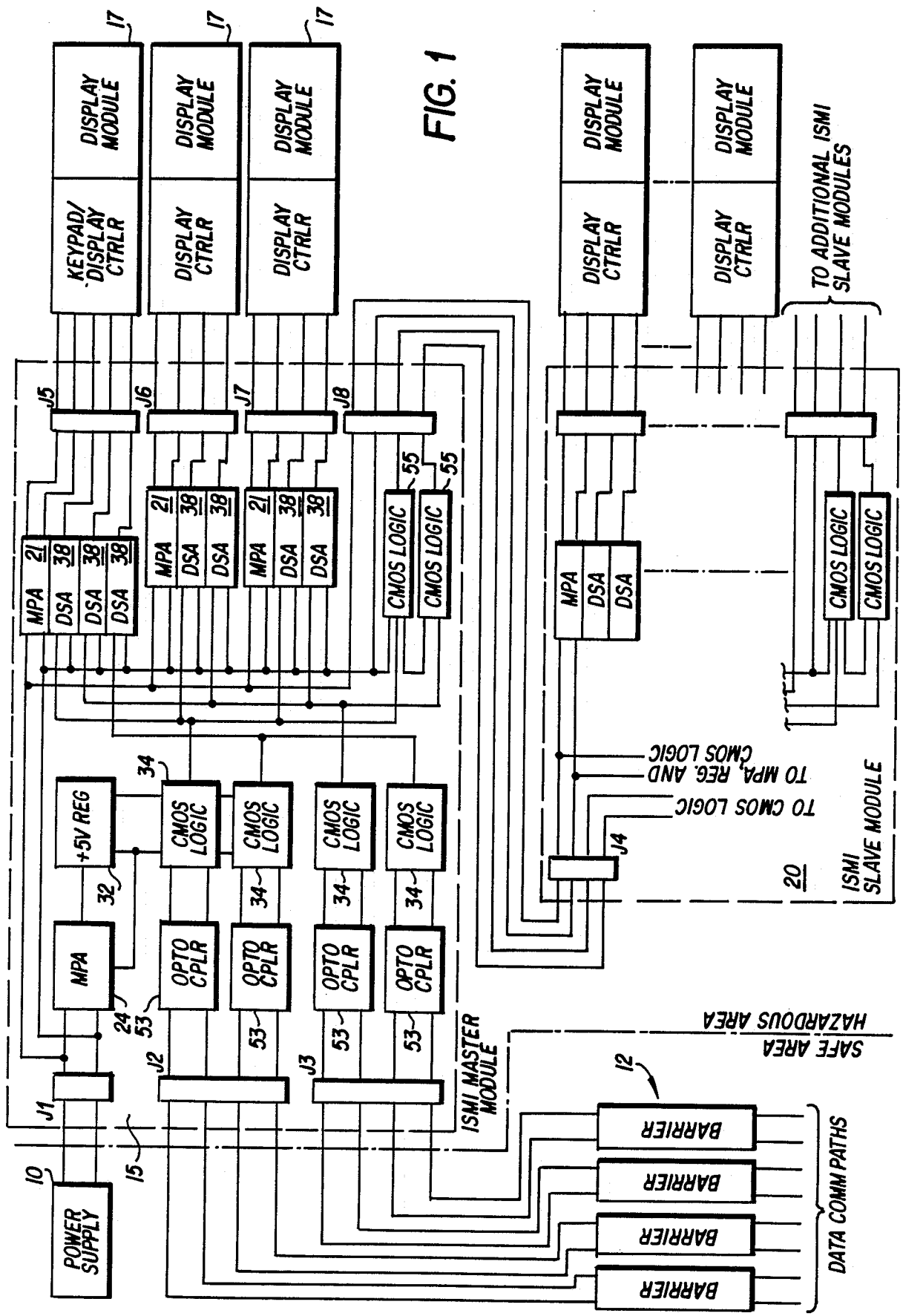
FIG. 1 is a block circuit diagram of an electronic system in which the power supply and data communication pathways emanate from a safe area and proceed into a hazardous area, and in which one or more ISMI modules in the hazardous area serve to interface the power supply and data communications paths to various plural load modules or devices.

Referring now to FIG. 1, an electrical system includes intrinsically safe circuits normally designed to be installed in a hazardous atmosphere, such as an explosive gas environment at a drilling rig. While the presently preferred embodiment is described, by way of example, for use in that environment, it is important to understand that the principles of the present invention are equally applicable to electronic data acquisition and presentation systems for monitoring and controlling equipment used in virtually any type of flammable atmosphere, including gases, vapors, dusts, and flyings, and in all industries in which flammable atmospheres are a risk.

Because all of the circuits in the environment in which the illustrative embodiment of the invention is employed cannot be made intrinsically safe, some circuits or portions of the circuits must be placed in a safe, that is, non-flammable, atmosphere. In the system of FIG. 1, a power supply 10, which is common to all of a plurality of load devices to be described presently, is disposed, together with a plurality of data communications paths, in the safe area. By reason of the use of conventional design techniques, the output of the power supply 10 is intrinsically safe, but data communications relative to the safe area are carried on via communication lines that are not part of the intrinsic safety circuit. Hence, the data communications lines must be separated from circuits in the hazardous area. A plurality of conventional zener barriers 12 may be provided in the plurality of data communications paths, to protect the current loop circuits associated with the communications paths entering the hazardous area. Each of zener barriers 12 is specified only by the maximum voltage and current which it can safely supply to the associated load device, and the maximum capacitance and inductance which can safely be connected to that barrier.

According to the present invention, the power supply circuit and the several data communication paths and associated current loops enter the hazardous area through an intrinsic safety module interface (IMSI), and specifically, at a master module 15. The master module includes connectors or junctions designated J1, J2, and J3 which accept the respective circuit paths from the safe area. As indicated in FIG. 1, master module 15 may be installed between circuitry in the safe area and the hazardous area in the location where conventional zener barrier devices would ordinarily be employed under prior art teachings. However, because the power supply output is intrinsically safe, the theoretical boundary between the safe and hazardous areas is at the power supply output, and, hence, the ISMI may be located entirely within the hazardous area.

For the sake of example in describing an embodiment of the invention, load devices 17 are display modules, but it will be recognized that the load devices may be of any general type which individually meet intrinsic safety requirements. The number of load devices which may be accommodated by ISMIs according to the present invention may vary, and hence, for the sake of flexibility, the ISMI master module 15 may be cascaded to a plurality of ISMI slave modules, one of which is also shown in part in FIG. 1, designated by reference numeral 20. By virtue of cascading, the number of load devices 17 which may be employed is limited only by the maximum current output of the power supply 10. In the exemplary embodiment, this maximum current was approximately 400 milliamperes (mA).

Figure 2:
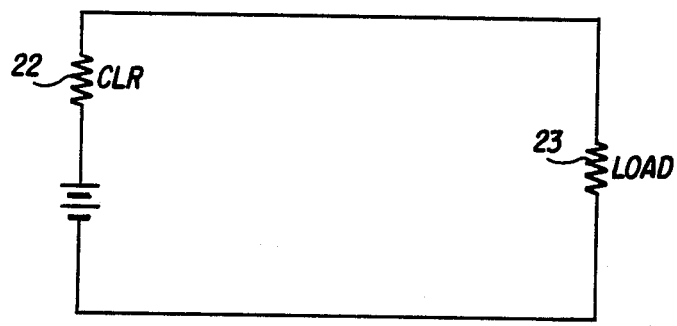
FIG. 2 is a diagram of a Thevenin equivalent circuit of the power supply and load device.

The Thevenin equivalent circuit for the power supply and load of FIG. 1 is shown in FIG. 2. Power supply 10 is a certified intrinsically safe for use in Group IIB environments, and, in the presently preferred exemplary embodiment, has an effective output impedance of approximately 10 ohms. The maximum output voltage of the power supply is 12 volts DC, and the maximum load output in a Group IIB hazardous area is limited to approximately 3.6 watts, in this embodiment. It has been determined, for such a power supply, that the effective load must be limited to a capacitance of 3.6 microfarads (uF), an inductance of 83 microhenries (uH), and an inductance/resistance ratio (L/R) of 17 microhenries/ohm.

The ISMI modules, master 15 and slaves 20, are implemented to allow multiple display modules and associated display controllers collectively constituting load devices 17 to be connected to and share the power supply 10 such that the sum of the capacitances of the plural load devices may exceed the maximum allowable capacitance for a single load. This effectively allows an increase in capacitance at any single load device from, say, 3.6 uF to 18 uF with a 1.5 safety factor, and 2.2 uF with a 3.0 safety factor. Specifically, the higher capacitance improves the operating performance of electronic circuits and gives the circuit designer greater flexibility to accommodate a greater number of load devices. To prevent the load devices from combining to create unsafe energy storing capabilities, they must also be segregated from one another, as will be explained in more detail below.

ISMI modules according to the present invention require that maximum power and voltage of each connected load device are limited to predetermined levels by a certified infallible power attenuation circuit. In the exemplary preferred embodiment of the invention, the attenuation for the power wiring associated with power supply 10 is accomplished using module power attenuators (MPAs). The MPAs 21 in the master module 15 of FIG. 1 are associated with common power supply 10 and load devices 17, with a separate MPA 21 servicing each respective load device 17. In addition, an MPA 21 is provided for attenuating the power to be supplied from power supply 10 to the other electronic devices utilized in the master module.

Figure 3:
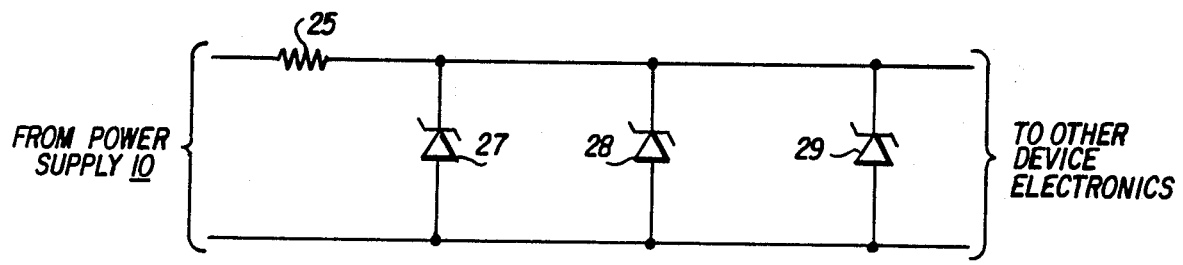
FIG. 3 is a circuit diagram illustrative of a module power attenuator (MPA) within the ISMI master module of FIG. 1.

Referring for the moment to FIG. 3, each MPA comprises a series resistance 25 to limit the current from the power supply to the respective load or other device, and a zener diode assembly including separate zener diodes 27, 28 and 29. The zener diodes are connected in parallel with one another across the series-coupled resistance 25 and common power supply 10 to limit the voltage applied to the load device or to other devices in the system. Triplicating the zener diodes in the MPA serves to provide an infallible power attenuation assembly. In the exemplary preferred embodiment, with component values of the type described above, series resistance 25 has a value of 75 ohms with a 5% tolerance and 5 watt dissipation, while zener diodes 27, 28 and 29 are rated at 6.8 volts with a 1% tolerance and 1.5 watt dissipation.

Each MPA in series with the power wiring to a respective load device (or other device requiring power from the common power supply 10) serves to reduce and limit the maximum applied voltage and to define the maximum power which may be transferred from the power supply to the respective load. This allows an increase in the permissible capacitance at the load device, which, in the exemplary preferred embodiment, is the maximum allowable capacitance of 18 uF with a safety factor of 1.5, or 2.25 uF with a safety factor of 3.0. In a manner corresponding to the voltage and power limiting functions of MPAs 21 with respect to each of the display modules, MPA 24 and associated voltage regulator 32 are utilized to limit the voltage and the power supplied to various associated electronic devices such as CMOS (complementary metal-oxide-semi-conductors) logic devices 34 and a plurality of DSAs 38 associated with display modules 17. The purpose of CMOS logic devices 34 will be described presently.

A typical implementation for a DSA 38 is simply a resistance in series with the incoming circuit (i.e., the data communications circuit or current loop from which the DSA receives current and voltage), to limit the current to the associated load device. The triple zener assembly employed for the MPA is not required in the DSA because the voltage level is already limited by MPA 24.

Accordingly, master module 15, through its respective MPAs and DSAs, reduces and limits the power supplied to each of respective display modules 17, both from the shared power supply 10 and from the data communications paths and associated current loops associated with the barrier devices 12.

It was noted earlier that the system of FIG. 1 enables the various load devices to be unspecified except for defining the maximum capabilities of storing energy and the segregation between loads. The segregation between load devices is required to prevent several loads from combining to produce unsafe energy storing capacities. Further, the data communications are received from the safe area, and, since the communication lines are separate intrinsic safety circuits, those paths must be separated from the circuits in the hazardous area. To that end, a plurality of certified opto-couplers 53 are connected into the respective data communications paths and current loops via connectors or junctions J2 and J3. The opto-couplers provide segregation between the intrinsically safe power supply circuit and the intrinsically safe data communications paths, to and from the safe area. An input to each opto-coupler 53 is received from a respective current loop associated with a data communications path. In the exemplary embodiment, the current in each loop may range from 0 to 20 mA. Zener barriers 12 protect each opto-coupler by limiting the maximum applied voltage and current from these current loops. Each of zener barriers 12 is rated at 28 volts and 93 mA, and is specified by the maximum voltage and current it can supply to its respective load, and the maximum capacitance and inductance that can safely be connected to the barrier. Because each opto-coupler 53 is a simple nonenergy storing device, it may be included without considering its effective load, although cable parameters must still be considered. Nevertheless, each opto-coupler must be certified to provide segregation between input and output.

The CMOS logic 34 associated with each opto-coupler 53 provides signal conditioning of the output of the latter. Because each logic device circuit is therefore a source of energy storage, the power applied to each such device must be limited in the same manner as for other storage devices. As previously described, MPA 24 serves that function, requiring only that the capacitance of the conditioning circuit (the logic device 34) must not exceed the output rating of the MPA (which in the preferred embodiment is 18 uF), and that segregation be maintained relative to the outputs of the other MPAs of the master module.

Because the data communication lines have been effectively separated from the safe area by the opto-couplers 53, those paths may now be routed onto IMSI slave modules 20 cascaded from the master module. As shown in FIG. 1, additional CMOS logic devices 55 are utilized to further condition the signals from the data communications paths in the routing to the next successive slave module. The outputs of master module 15 at junction J8 are supplied to the inputs at junction J4 of slave module 20. Each slave module 20 is substantially identical to the master module 15 except that no opto-couplers are required since the data communications paths have already been effectively segregated. The number of logic circuits 34 associated with the respective DSAs of the slave module is that number which is sufficient to accommodate the data communications paths entering the respective slave modules. In slave module 20 at FIG. 1, for example, two CMOS logic devices 34 are required for the two incoming data paths. As in the case of master module 15, the MPAs and DSAs are, in combination, equal in number to the number of load devices to be served by the slave module.

Preferably, the entire assembly of ISMI master modules 15 and ISMI slave modules 20 is encapsulated. This serves two functions. First, the encapsulation aids in achieving the highest possible ambient temperature rating by diffusing any local component heating throughout the entire mass of the modules. Secondly, the size of the mounting board (such as a printed circuit board) for the assembly may be reduced by virtue of the reduction in the physical segregation distances described above.

Although a presently preferred embodiment of the present invention has been described herein, it will be apparent to those skilled in the art to which the invention pertains that variations and modifications of the described embodiment may be made without departing from the true spirit and scope of the invention. Accordingly, it is intended that the invention be limited only to the extent required by the appended claims and the applicable rules of law.

What is claimed is:

1. An interface system interconnecting a common power source and a plurality of data communications paths located in a safe environment to a plurality of load devices located in a flammable atmosphere which share said common power source, said interface system comprising first attenuating means in said flammable atmosphere for attenuating the electrical power supplied by said power source to said plurality of load devices to a first predetermined power level, second attenuating means in said flammable atmosphere for attenuating the electrical power delivered by said data communications paths to said plurality of load devices to a second predetermined power level, said first and second attenuating means increasing the total electrical power transferred from said common power supply to said load devices such that the sum of storage capacities of said load devices is greater than an allowable storage capacity for a single load device consisting of any of said load devices, and coupling means for segregating said power source from said data communications paths to and from said safe environment.

2. The interface system of claim 1, wherein said first attenuating means includes an electrical resistance of preselected value in series with said power source to limit the current therefrom to a respective one of said plurality of load devices, and a plurality of zener diodes connected in parallel with one another between the serially connected power source and resistance and the said respective one of the load devices, to limit the voltage supplied to said respective one of the load devices.

3. The interface system of claim 2, wherein said plurality of zener diodes consists of three zener diodes.

4. The interface system of claim 2, wherein said plurality of zener diodes consists of three zener diodes connected in parallel with one another.

5. The interface system of claim 2, wherein said second attenuating means consists solely of an electrical resistance of preselected value to limit the current of the load device associated therewith to a predetermined level.

6. The interface system of claim 1, wherein said coupling means comprises at least one opto-coupler.

7. The interface system of claim 2, wherein said coupling means comprises a plurality of opto-couplers, one in each of said data communications paths.

8. The interface system of claim 7, further including logic means for conditioning the output of the respective opto-coupler for application to a respective one of said load devices.

9. The interface system of claim 4, wherein said coupling means comprises a plurality of opto-couplers, one in each of said data communication paths, and logic means in circuit with said opto-couplers for conditioning the outputs thereof to said load devices.

10. In an electronic data acquisition and display system for monitoring and controlling equipment in flammable atmospheres, using electrical circuitry partly installed in a safe non-flammable atmosphere, the combination comprising a power supply installed in said safe atmosphere and having an intrinsically safe output circuit, a plurality of load devices disposed in said flammable atmosphere and sharing said power supply via said electrical circuitry, said load devices adapted to store electrical energy, a plurality of data communications paths disposed in said safe area, barrier means connected to said electrical circuitry and to said data communications paths for coupling said paths to said load devices while limiting the transfer of electrical energy from said paths to said devices; said electrical circuitry including attenuating means for reducing the level of electrical energy delivered to said load devices from said power supply, and further including electrical isolation means for decoupling said data communications paths from said power supply.

11. In a system of intrinsically safe electrical circuits for installation in a flammable atmosphere for interaction with interconnected energy storage devices therein, and wherein a portion of the electrical circuits is to be installed in a safe non-flammable atmosphere, the combination comprising a power supply common to all of said energy storage devices; a plurality of data communications circuits, one for each energy storage device; power attenuating means connected between said power supply and said energy storage devices for increasing the total allowable energy storage capacity of the energy storage devices; and isolating means for segregating said interconnected energy storage devices while allowing them to share power and communications from said common power supply and said plurality of data communications circuits.

12. In a system of intrinsically safe electrical circuits for installation in a flammable atmosphere for interaction with interconnected energy storage devices therein, and wherein a portion of the electrical circuits is to be installed in a safe non-flammable atmosphere, the combination comprising a power supply common to all of said energy storage devices; a plurality of data communications circuits, one for each energy storage device; and means for increasing the total power transferred from said common power supply to said plurality of energy storage devices, such that the sum of the storage capacities of said plurality of energy storage devices is greater than the allowable storage capacity for a single intrinsically safe device consisting of any of said plurality of energy storage devices.

* * * * *